United States Patent
Massa et al.

(10) Patent No.: US 8,940,362 B2
(45) Date of Patent: Jan. 27, 2015

(54) METHOD FOR MANUFACTURING POROUS PARTICLES WITH NON-POROUS SHELL

(75) Inventors: Dennis J. Massa, Pittsford, NY (US);
Mridula Nair, Penfield, NY (US);
Tamara K. Jones, Rochester, NY (US);
Dale E. Hamilton, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 2208 days.

(21) Appl. No.: 11/870,710

(22) Filed: Oct. 11, 2007

(65) Prior Publication Data

US 2009/0098288 A1    Apr. 16, 2009

(51) Int. Cl.
*B05D 7/00* (2006.01)
*C08J 3/16* (2006.01)
*C08J 9/28* (2006.01)

(52) U.S. Cl.
CPC .... *C08J 3/16* (2013.01); *C08J 9/28* (2013.01); *C08J 2201/05* (2013.01); *C08J 2201/0502* (2013.01); *C08J 2201/0504* (2013.01)
USPC ........................................................ 427/212

(58) Field of Classification Search
USPC ........................................................ 427/212
See application file for complete search history.

(56) References Cited

U.S. PATENT DOCUMENTS

| | | | |
|---|---|---|---|
| 3,943,063 A * | 3/1976 | Morishita et al. | 427/213.36 |
| 3,979,342 A | 9/1976 | Baidins et al. | |
| 4,254,201 A | 3/1981 | Sawai et al. | |
| 4,339,237 A | 7/1982 | Wang et al. | |
| 4,379,825 A | 4/1983 | Mitushashi | |
| 4,461,849 A | 7/1984 | Karickhoff | |
| 4,489,174 A | 12/1984 | Karickhoff | |
| 4,833,060 A | 5/1989 | Nair et al. | |
| 4,965,131 A | 10/1990 | Nair et al. | |
| 5,126,181 A | 6/1992 | Figuly et al. | |
| 5,545,504 A | 8/1996 | Keoshkerian et al. | |
| 5,608,017 A | 3/1997 | Kamiyama et al. | |
| 5,656,373 A | 8/1997 | Scarpa et al. | |
| 5,717,041 A | 2/1998 | Kamiyama et al. | |
| 6,048,908 A * | 4/2000 | Kitagawa | 521/56 |
| 6,171,743 B1 | 1/2001 | Nakamura | |

(Continued)

FOREIGN PATENT DOCUMENTS

EP    0083188    5/1983
EP    0750007    12/1996

(Continued)

OTHER PUBLICATIONS

DOW, Product Safety Assessment n-Butanol, Apr. 30, 2006, p. 1-5.*

*Primary Examiner* — Tabatha Penny
(74) *Attorney, Agent, or Firm* — Andrew J. Anderson (57) ABSTRACT

A method of manufacturing porous core-shell polymer particles having a nonporous shell including: providing a first organic solvent containing a dissolved polymer; dispersing the organic solvent in an aqueous phase containing a stabilizer to form an emulsion; adding the emulsion to a second organic solvent wherein the second organic solvent is miscible with water and the first organic solvent, and a non-solvent for the polymer; and evaporating the first and second organic solvents from the emulsion to form core-shell polymer particles. The method results in core-shell polymer particles comprising a common binder polymer for the core and the shell wherein the core has a porosity and the shell is non-porous. The particles have a porosity from 10 to 70 percent.

10 Claims, 3 Drawing Sheets

(56) References Cited

U.S. PATENT DOCUMENTS

| | | |
|---|---|---|
| 6,291,013 B1 * | 9/2001 | Gibson et al. .............. 427/213.3 |
| 6,689,465 B1 | 2/2004 | Omori et al. |
| 6,924,595 B2 | 8/2005 | Wang et al. |
| 7,041,420 B2 | 5/2006 | Vandewinckel et al. |
| 2002/0068233 A1 | 6/2002 | Ezenyilimba et al. |
| 2003/0054280 A1 | 3/2003 | Ishihara et al. |
| 2005/0026064 A1 * | 2/2005 | Sugiura et al. ............. 430/109.4 |
| 2006/0263590 A1 | 11/2006 | Cheng et al. |
| 2006/0281834 A1 | 12/2006 | Lee et al. |
| 2007/0141501 A1 | 6/2007 | Jin et al. |
| 2008/0176157 A1 | 7/2008 | Yang et al. |
| 2008/0176164 A1 | 7/2008 | Nair et al. |
| 2008/0268363 A1 | 10/2008 | Nair et al. |
| 2008/0268367 A1 | 10/2008 | Nair et al. |
| 2009/0098382 A1 | 4/2009 | Massa et al. |

FOREIGN PATENT DOCUMENTS

| | | |
|---|---|---|
| EP | 1280011 | 1/2003 |
| EP | 1720077 | 11/2006 |
| JP | 64000269 | 1/1989 |
| JP | 01-167846 | 7/1989 |
| JP | 0326729 | 2/1991 |
| JP | 06138699 | 5/1994 |
| JP | 08-220793 | 8/1996 |
| WO | WO 92/13027 | 8/1992 |
| WO | WO 2007/075941 | 7/2007 |
| WO | WO 2008/088700 | 8/2008 |

* cited by examiner

METHOD FOR MANUFACTURING POROUS PARTICLES WITH NON-POROUS SHELL

CROSS-REFERENCE TO RELATED APPLICATIONS

This application relates to commonly assigned application Ser. No. 11/870,651, published as 2009/0098382 on Apr. 16, 2009, filed simultaneously herewith and hereby incorporated by reference for all that it discloses.

FIELD OF THE INVENTION

This invention relates to novel particles having improved properties, more particularly to polymer particles having porosity and most particularly, to toner particles having porous cores and non-porous shells which are both the same polymer.

BACKGROUND OF THE INVENTION

Conventional electrophotographic toner powders are made up of a binder polymer and other ingredients, such as pigment and a charge control agent, that are melt blended on a heated roll or in an extruder. The resulting solidified blend is then ground or pulverized to form a powder. Inherent in this conventional process are certain drawbacks. For example, the binder polymer must be brittle to facilitate grinding. Improved grinding can be achieved at lower molecular weight of the polymeric binder. However, low molecular weight binders have several disadvantages; they tend to form toner/developer flakes; they promote scumming of the carrier particles that are admixed with the toner powder for electrophotographic developer compositions; their low melt elasticity increases the off-set of toner to the hot fuser rollers of the electrophotographic copying apparatus, and the glass transition temperature (Tg) of the binder polymer is difficult to control. In addition, grinding of the polymer results in a wide particle size distribution. Consequently, the yield of useful toner is lower and manufacturing cost is higher. Also the toner fines accumulate in the developer station of the copying apparatus and adversely affect the developer life.

The preparation of toner polymer powders from a preformed polymer by a chemically prepared toner process such as "Evaporative Limited Coalescence" (ELC) offers many advantages over the conventional grinding method of producing toner particles. In ELC, polymer particles having a narrow size distribution are obtained by forming a solution of a polymer in a solvent that is immiscible with water, dispersing the solution so formed in an aqueous medium containing a solid colloidal stabilizer and removing the solvent. The resultant particles are then isolated, washed and dried.

In the practice of this technique, polymer particles are prepared from any type of polymer that is soluble in a solvent that is immiscible with water. Thus, the size and size distribution of the resulting particles can be predetermined and controlled by the relative quantities of the particular polymer employed, the solvent, the quantity and size of the water insoluble solid particulate suspension stabilizer, typically silica or latex, and the size to which the solvent-polymer droplets are reduced by mechanical shearing using rotor-stator type colloid mills, high pressure homogenizers, agitation etc.

Limited coalescence techniques of this type have been described in numerous patents pertaining to the preparation of electrostatic toner particles because such techniques typically result in the formation of polymer particles having a substantially uniform size distribution. Representative limited coalescence processes employed in toner preparation are described in U.S. Pat. Nos. 4,833,060 and 4,965,131 to Nair et al., and U.S. Pat. No. 6,294,595 to Tyagi, incorporated herein by reference for all that they contain.

This technique includes the following steps: mixing a polymer material, a solvent and optionally a colorant and a charge control agent to form an organic phase; dispersing the organic phase in an aqueous phase comprising a particulate stabilizer and homogenizing the mixture; evaporating the solvent and washing and drying the resultant product.

There is a need to reduce the amount of toner applied to a substrate in the Electrophotographic Process (EP). Porous toner particles in the electrophotographic process can potentially reduce the toner mass in the image area. Simplistically, a toner particle with 50% porosity should require only half as much mass to accomplish the same imaging results. Hence, toner particles having an elevated porosity will lower the cost per page and decrease the stack height of the print as well. The application of porous toners provides a practical approach to reduce the cost of the print and improve the print quality.

U.S. Pat. Nos. 3,923,704; 4,339,237; 4,461,849; 4,489,174 and EP 0083188 discuss the preparation of multiple emulsions by mixing a first emulsion in a second aqueous phase to form polymer beads. These processes produce porous polymer particles having a large size distribution with little control over the porosity. This is not suitable for toner particles.

U.S. Publication No. 2005/0026064 describes a porous toner particle. However control of particle size distribution is a problem and these porous particles have porous surfaces. Conventional toners have solid surfaces and properties such as tribocharging and transfer may be adversely affected by a porous surface. The present invention solves these problems and provides a less complex method to manufacture porous particles.

U.S. Pat. Nos. 5,608,017 and 5,717,041 describe a polymerized particle useful as toner having a cavity structure. However, FIG. 3 in said patents show that the cavities connect to the particle surface making it porous.

U.S. Pat. No. 4,379,825 describes porous toners made by mixing and kneading a polymeric material including an elimination compound. The toner has voids or pores on the surface.

U.S. Pat. No. 4,110,529, discloses a method for manufacturing porous spherical polymer particles made by dissolving the polymer in a solvent, dispersing this solution into a liquid dispersing medium that is a nonsolvent for the polymer, and then adding the solution, while stirring, into a liquid that is a nonsolvent for the polymer and which is also immiscible with the dispersing medium. It will be shown later that this method does not produce porous particles using our process.

Japanese Kokai 63-147171 describes a developer suitable to a development system constituted by combining the advantages of a wet and a dry system where a small-diameter sponge is impregnated with a liquid developer. Said small-diameter sponge has a porous surface.

Japanese Kokai 08-220793 describes electrophotographic toner where porosity of the toner particle is specified to 0.51 to 0.54. However, there is no mention of a non-porous shell.

Japanese Kokai 01-167846 describes a toner that is formed by impregnating liquid ink in the pores of microporous polymers particles. A porous surface is required to impregnate the ink.

An object of the present invention is to provide a polymer particle with porosity.

A further object of the present invention is to provide a toner particle with porosity.

A still further object of the present invention is to provide a toner particle with a narrow size distribution.

A still further object of the present invention is to provide a porous toner particle with surface properties similar to solid toner particles.

SUMMARY OF THE INVENTION

The present invention is core-shell polymer particles comprising a common binder polymer for the core and the shell wherein the core has a porosity and the shell is non-porous. The particle has a porosity from 10 to 70 percent.

For a better understanding of the present invention together with other advantages and capabilities thereof, reference is made to the following description and appended claims in connection with the preceding drawings.

DETAILED DESCRIPTION OF THE INVENTION

The use of porous toner particles in the electrophotographic process will reduce the toner mass in the image area. For example toner particles with 50% porosity should require only half as much mass to accomplish the same imaging results. Hence, toner particles having an elevated porosity will lower the cost per page and decrease the stack height of the print as well. The porous toner technology of the present invention provides a thinner image so as to improve the image quality, reduce curl, reduce image relief, save fusing energy and feel/look more close to offset printing rather than typical EP printing. In addition, colored porous particles of the present invention will narrow the cost gap between color and monochrome prints. Those potentials are expected to expand the EP process to broader application areas and promote more business opportunities for EP technology.

Porous polymer particles are used in various applications, such as chromatographic columns, ion exchange and adsorption resins, as drug delivery vehicles, scaffolds for tissue engineering, in cosmetic formulations, and in the paper and paint industries. The methods for generating pores inside polymer particles are known in the field of polymer science. However, due to the specific requirements for the toner binder materials, such as suitable glass transition temperatures, cross-linking density and rheology, and sensitivity to particle brittleness that comes from enhanced porosity, the preparation of porous toners is not straightforward. In the present invention, porous particles are prepared using a suspension process, particularly, the ELC process in conjunction with phase separation.

The particles of the present invention have porous cores and non-porous shells where the cores have "micro", "meso" and "macro" pores which according to the International Union of Pure and Applied Chemistry are the classifications recommended for pores less than 2 nm, 2 to 50 nm, and greater than 50 nm respectively. The term porous will be used herein to include pores of all sizes, including open or closed pores. The shells are non-porous meaning that there is 1% or less pore content as measured by scanning electron microscopy of a particle (cross-section) surface at 5000× magnification.

The porous core-shell particles of the present invention can be made by several techniques. For example, porous particles can be over coated with a non-porous shell by spray coating with molten polymer and cooling or by spray coating with a polymer solution and drying. Stoy, U.S. Pat. No. 4,110,529, discloses a method for manufacturing porous spherical polymer particles made by dissolving the polymer in a solvent, dispersing this solution into a liquid dispersing medium that is a nonsolvent for the polymer, and then adding the solution, while stirring, into a liquid that is a nonsolvent for the polymer and which is also immiscible with the dispersing medium. It will be shown later that this method does not produce porous particles using our process. Sugiura et al., US 2005/0026064, disclose a toner having a particle including at least one having a diameter of 10 nm or more, and a porosity thereof in the range of from 0.01 to 0.60. The porosity is generated via a polyurethane or polyurea chemical polymerization reaction. Other common techniques for making core-shell particles may also be used, but the porous particles of the present invention have the same polymer for the core and shell, which makes synthesis by known methods difficult or impossible. For instance, when spray coating with a polymer solution the solvent will most probably dissolve all or some of the pre-made porous core making it non-porous.

The preferred process for making the porous core-shell particles of this invention involves formation of an oil-in-water emulsion and is basically a four-step process where the third step includes phase separation to form porosity in the core.

The first step is to provide a first organic solvent containing a dissolved polymer.

The present invention is applicable to the preparation of polymeric particles from any type of polymer or resin that is capable of being dissolved in a solvent that is immiscible with water wherein the polymer itself is substantially insoluble in water. Useful polymers include those derived from vinyl monomers, such as styrene monomers, and condensation monomers such as esters and mixtures thereof. As the binder polymer, known binder resins are useable. Concretely, these binder resins include homopolymers and copolymers such as polyesters, styrenes, e.g. styrene and chlorostyrene; monoolefins, e.g. ethylene, propylene, butylene and isoprene; vinyl chloride; vinyl esters, e.g. vinyl acetate, vinyl propionate, vinyl benzoate and vinyl butyrate; α-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone.

Particularly desirable binder polymers/resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. Also, especially useful are polyesters of aromatic or aliphatic dicarboxylic acids with one or more aliphatic diols, such as polyesters of isophthalic or terephthalic or fumaric acid with diols such as ethylene glycol, cyclohexane dimethanol and bisphenol adducts of ethylene or propylene oxides.

Preferably the acid values (expressed as milligrams of potassium hydroxide per gram of resin) of the polyester resins are in the range of 2-100. The polyesters may be saturated or unsaturated. Of these resins, styrene/acryl and polyester resins are particularly preferable.

In the practice of this invention, it is particularly advantageous to utilize resins having a viscosity in the range of 1 to 100 centipoise when measured as a 20 weight percent solution in ethyl acetate at 25° C.

Any suitable organic solvent that will dissolve the polymer and which is also immiscible with water may be used in the practice of this invention such as for example, chloromethane, dichloromethane, ethyl acetate, propyl acetate, trichloromethane, carbon tetrachloride, ethylene chloride, trichloroethane, toluene, xylene, cyclohexanone, 2-nitropropane and the like. A particularly useful solvent in the practice of this invention are ethyl acetate and propyl acetate for the reason that they are both good solvents for many polymers while at the same time being sparingly soluble in water. Further, their volatility is such that they are readily removed from the discontinuous phase droplets as described below, by evaporation.

Optionally, the solvent that will dissolve the binder polymer and which is immiscible with water may be a mixture of two or more water-immiscible solvents chosen from the list given above. Optionally, the solvent may comprise a mixture of one or more of the above solvents and a minor proportion of a water-immiscible nonsolvent for the binder polymer such as heptane, cyclohexane, diethylether and the like, in which the nonsolvent is added in such a minor proportion that it is not sufficient to precipitate the binder polymer prior to drying and isolation.

Various additives generally present in electrophotographic toner may be added to the binder polymer prior to dissolution in the solvent, or after the dissolution step itself, such as colorants, charge control agents, and release agents such as waxes and lubricants.

Colorants, a pigment or dye, suitable for use in the practice of the present invention are disclosed, for example, in U.S. Reissue Pat. 31,072 and in U.S. Pat. Nos. 4,160,644; 4,416,965; 4,414,152 and 2,229,513. As the colorants, known colorants can be used. The colorants include, for example, carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. Colorants can generally be employed in the range of from about 1 to about 90 weight percent on a total toner powder weight basis, and preferably in the range of about 2 to about 20 weight percent, and most preferably from 4 to 15 weight percent in the practice of this invention. When the colorant content is 4% or more by weight, a sufficient coloring powder can be obtained, and when it is 15% or less by weight, good transparency can be obtained. Mixtures of colorants can also be used. Colorants in any form such as dry powder, its aqueous or oil dispersions or wet cake can be used in the present invention. Colorant milled by any methods like media-mill or ball-mill can be used as well.

The release agents preferably used herein are waxes. Concretely, the releasing agents usable herein are low-molecular weight polyolefins such as polyethylene, polypropylene and polybutene; silicone resins which can be softened by heating; fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products thereof. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the amount of the wax inclined to be exposed to the toner particle surface, waxes having a melting point in the range of 30 to 150° C. are preferred and those having a melting point in the range of 40 to 140° C. are more preferred.

The wax is, for example, 0.1 to 20% by mass, and preferably 0.5 to 9% by mass, based on the toner.

The term "charge control" refers to a propensity of a toner addendum to modify the triboelectric charging properties of the resulting toner. A very wide variety of charge control agents for positive charging toners are available. A large, but lesser number of charge control agents for negative charging toners, is also available. Suitable charge control agents are disclosed, for example, in U.S. Pat. Nos. 3,893,935; 4,079,014; 4,323,634; 4,394,430 and British Patents 1,501,065; and 1,420,839. Charge control agents are generally employed in small quantities such as, from about 0.1 to about 5 weight percent based upon the weight of the toner. Additional charge control agents that are useful are described in U.S. Pat. Nos. 4,624,907; 4,814,250; 4,840,864; 4,834,920; 4,683,188 and 4,780,553. Mixtures of charge control agents can also be used.

The second step in the formation of the porous particles of this invention involves forming an emulsion by dispersing the above mentioned polymer solution in an aqueous phase containing either stabilizer polymers such as poylvinylpyrrolidone or polyvinylalcohol or more preferably colloidal silica such as LUDOX™ or NALCO™ or latex particles in a modified ELC process described in U.S. Pat. Nos. 4,883,060; 4,965,131; 2,934,530; 3,615,972; 2,932,629 and 4,314,932, the disclosures of which are hereby incorporated by reference.

Preferably, in the second step of the process of the present invention, the polymer solution is mixed with an aqueous phase containing colloidal silica stabilizer to form an aqueous suspension of droplets that is subjected to shear or extensional mixing or similar flow processes to reduce the droplet size and achieve narrow size distribution droplets through the limited coalescence process. The pH of the aqueous phase is generally between 4 and 7 when using silica as the colloidal stabilizer.

The actual amount of silica used for stabilizing the droplets depends on the size of the final porous particle desired as with a typical limited coalescence process, which in turn depends on the volume and weight ratios of the various phases used for making the emulsion.

Any type of mixing and shearing equipment may be used to perform the second step of this invention, such as a batch mixer, planetary mixer, single or multiple screw extruder, dynamic or static mixer, colloid mill, high pressure homogenizer, sonicator, or a combination thereof. While any high shear type agitation device is applicable to this step of the present invention, a preferred homogenizing device is the Microfluidizer™ such as Model No. 110T produced by Microfluidics Manufacturing. In this device, the droplets of polymer solution are dispersed and reduced in size in the aqueous phase (continuous phase) in a high shear agitation zone and, upon exiting this zone, the particle size of the dispersed oil is reduced to uniform sized dispersed droplets in the continuous phase. The temperature of the process can be modified to achieve the optimum viscosity for emulsification of the droplets and to control evaporation of the solvent. In the method of this invention, the range of back pressure suitable for producing acceptable particle size and size distribution is between 100 and 5000 psi, preferably between 500 and 3000 psi. The preferable flow rate is between 1000 and 6000 mL per minute.

The third step in the preparation of the porous particles of this invention involves adding the emulsion to a second organic solvent wherein the second organic solvent is miscible with water and the first organic solvent, and is a non-solvent for the polymer. The preferred second organic solvent is an alcohol. Especially preferred are methanol, ethanol, butanol, isopropanol and propanol. The second organic solvent causes phase separation to occur that forms the porosity within the core. It is surprising, however, that the shell is non-porous. Optionally, in this step surfactants may be present in the second organic solvent to prevent any undesired aggregation of particles.

The fourth step in the preparation of the porous particles of this invention involves removal of the first organic solvent so as to produce a suspension of uniform porous polymer particles with a porous core and non-porous shell in an aqueous media that may also contain the second organic solvent depending upon its volatility. Solvent removal apparatus such as a rotary evaporator or a flash evaporator may be used. The porous polymer particles are isolated after removing the first organic solvent by filtration or centrifugation, followed by drying in an oven at 40° C. that removes water and the second organic solvent. Optionally, the particles are treated with alkali to remove the silica stabilizer.

Optionally, the fourth step in the preparation of porous particles described above may include the addition of more water prior to removal of the solvent or at any time during solvent removal, isolation and drying.

The average particle diameter of the porous particles of the present invention is, for example, 2 to 50 micrometers, preferably 3 to 20 micrometers.

The porosity of the particles is between 10 and 90% and preferably between 10 and 70%.

The shape of toner particles has a bearing on the electrostatic toner transfer and cleaning properties. Thus, for example, the transfer and cleaning efficiency of toner particles have been found to improve as the sphericity of the particles is reduced. A number of procedures to control the shape of toner particles are known in the art. In the practice of this invention, additives may be employed in the water phase or in the oil phase if necessary. The additives may be added after or prior to forming the water-in-oil-in-water emulsion. In either case, the interfacial tension is modified as the solvent is removed resulting in a reduction in sphericity of the particles. U.S. Pat. No. 5,283,151 describes the use of carnauba wax to achieve a reduction in sphericity of the particles. U.S. Ser. No. 11/611,208-filed Dec. 15, 2006 entitled "Toner Particles of Controlled Surface Morphology and Method of Preparation", now U.S. Pat. No. 7,662,535, describes the use of certain metal carbamates that are useful to control sphericity and U.S. Ser. No. 11/611,226 filed Dec. 15, 2006 entitled "Chemically Prepared Toner Particles with Controlled Shape", now U.S. Pat. No. 7,655,375, describes the use of specific salts to control sphericity. U.S. Ser. No. 11/472,779 filed Jun. 22, 2006 entitled "Toner Particles of Controlled Morphology", now U.S. Publication No. 2007/0298346, describes the use of quaternary ammonium tetraphenylborate salts to control sphericity. These applications are incorporated by reference herein.

Toner particles of the present invention may also contain flow aids in the form of surface treatments. Surface treatments are typically in the form of inorganic oxides or polymeric powders with typical particle sizes of 5 nm to 1000 nm. With respect to the surface treatment agent also known as a spacing agent, the amount of the agent on the toner particles is an amount sufficient to permit the toner particles to be stripped from the carrier particles in a two component system by the electrostatic forces associated with the charged image or by mechanical forces. Preferred amounts of the flow aids are from about 0.05 to about 10 weight percent, and most preferably from about 0.1 to about 5 weight percent, based on the weight of the toner.

The spacing agent can be applied onto the surfaces of the toner particles by conventional surface treatment techniques such as, but not limited to, conventional powder mixing techniques, such as tumbling the toner particles in the presence of the spacing agent. Preferably, the spacing agent is distributed on the surface of the toner particles. The spacing agent is attached onto the surface of the toner particles and can be attached by electrostatic forces or physical means or both. With mixing, preferably uniform mixing is preferred and achieved by such mixers as a high energy Henschel-type mixer that is sufficient to keep the spacing agent from agglomerating or at least minimizes agglomeration. Furthermore, when the spacing agent is mixed with the toner particles in order to achieve distribution on the surface of the toner particles, the mixture can be sieved to remove any agglomerated spacing agent or agglomerated toner particles. Other means to separate agglomerated particles can also be used for purposes of the present invention.

The preferred spacing agent is silica, such as those commercially available from Degussa, like R-972, or from Wacker, like H2000. Other suitable spacing agents include, but are not limited to, other inorganic oxide particles, polymer particles and the like. Specific examples include, but are not limited to, titania, alumina, zirconia, and other metal oxides; and also polymer particles preferably less than 1 μm in diameter (more preferably about 0.1 μm), such as acrylic polymers, silicone-based polymers, styrenic polymers, fluoropolymers, copolymers thereof, and mixtures thereof. The invention will further be illustrated by the following examples. They are not intended to be exhaustive of all possible variations of the invention.

EXAMPLES

The Kao Binder E, a polyester resin, used in the examples below was obtained from Kao Specialties Americas LLC a part of Kao Corporation, Japan. LUDOX™, a colloidal silica, was obtained from DuPont as a 50 weight percent dispersion.

The Pigment Blue 15:3 was obtained from Sun Chemical, Cincinnati, Ohio. It was obtained as a 40% by mass dispersion in a polyester binder.

The size and shape of the particles were measured directly using scanning electron microscopy (SEM). The extent of porosity of the particles was visualized by cryofracturing the particles, using liquid nitrogen and a mortar and pestle, and observing the fractured particles directly by SEM. Additional methods for measuring particle size and porosity are described below.

The porosity of the particles was analyzed by mercury intrusion porosimetry using an AutoPore IV model 9500 manufactured by Micromeretics Instrument Corporation based in Norcross, Ga. All samples were analyzed with the same preparatory conditions and pressure ramp table of 3.8 kPa to 413.7 MPa and then decreased to atmospheric pressure again. All samples were equilibrated at each pressure point for 10 seconds both on the low and high-pressure ranges. The percent porosity for the sample was calculated from ratio of the void volume to the total initial volume. (Webb, P.; Orr, C. Analytical Methods in Find Particle Technology; Micromeretics Instrument Corp.; Norcross, Ga., 1997.)

The size and shape of the particles are measured using a Sysmex FPIA-3000 automated particle shape and size analyzer from Malvern Instruments. Samples pass through a sheath flow cell that transforms the particle suspension into a narrow or flat flow, ensuring that the largest area of the particle is oriented towards the camera and that all particles are in focus. The CCD camera captures 60 images every second and these are analyzed in real time. Numerical evaluation of particle shape is derived from measurement of the area of the particle. A number of shape factors are calculated including circularity, aspect ratio and circle equivalent diameter.

The particle size distribution is characterized by a Coulter Particle Analyzer. The volume median value from the Coulter measurements is used to represent the particle size of the particles described in these examples.

The extent of porosity of the particles of the present invention can be visualized using a range of microscopy techniques. For example, prior to drying, light microscopy was used to visualize the porous structure created by the process described herein. After drying, conventional Scanning Electron Microscope (SEM) imaging was used to image fractured samples and view the inner pore structure. The Scanning Electron Microscope (SEM) images give an indication of the porosity of the particles but are not normally used for quantification. The outside or overall diameter of the particles is easily measured with a number of aforementioned particle measurement techniques, but determining the extent of particle porosity can be problematic. Determining particle porosity using typical gravitational methods can be problematic due to the size and distribution of pores in the particles and whether or not some pores break through to the particle surface. To accurately determine the extent of porosity in the particles of the present invention mercury porosimetry was used, as described above.

The porous polymer particles of this invention were made using the following general procedure:

Example 1

Invention

Figure 1:
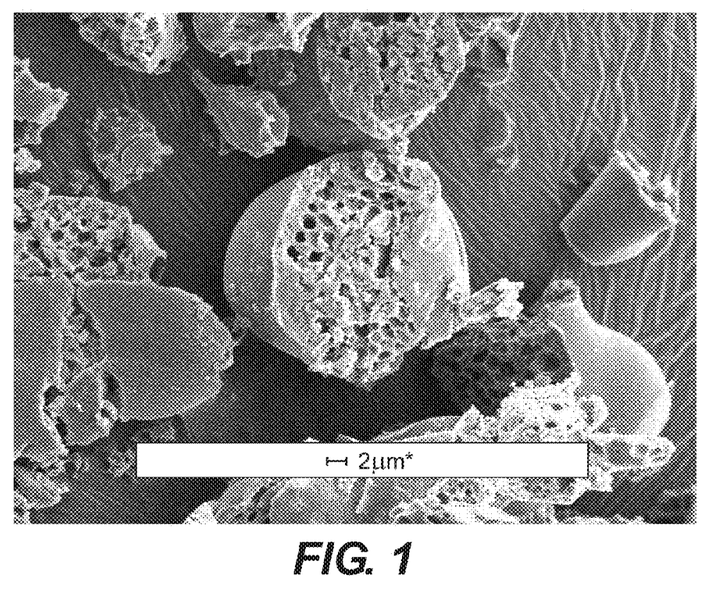
FIG. 1 is an SEM cross sectional image of a fractured particle from Example 1 showing a porous interior and a nonporous shell in accordance with the present invention.

Preparation of Porous Particles where Core has a Porosity and the Shell is Non-Porous Using Methanol for Phase Separation Twenty (20) grams of Kao E polymer resin was dissolved in 80 grams of ethyl acetate and dispersed in 300 grams of a water phase comprising a pH 4 citrate/phosphate buffer and 1.4 grams of LUDOX™, followed by homogenization in a Microfluidizer™ to form a limited coalescence (LC) emulsion. This emulsion was then added dropwise to a tenfold excess of isopropanol. The ethyl acetate was evaporated using a Buchi Rotovapor RE120 at 35° C. under reduced pressure. The resulting suspension of polymer particles was filtered using a glass fritted funnel, washed with water several times and dried in a vacuum oven at 35° C. for 16 hours. The particle size was between 16 and 18 micrometers, as measured by scanning electron microscopy, and the porosity was 42 percent, as measured by mercury intrusion porosimetry. FIG. 1, which is a SEM cross-section of cryofractured particles of this Example shows the high level of porosity in the core and a non-porous shell that is the same binder as the core.

Example 2

Invention

Figure 2:
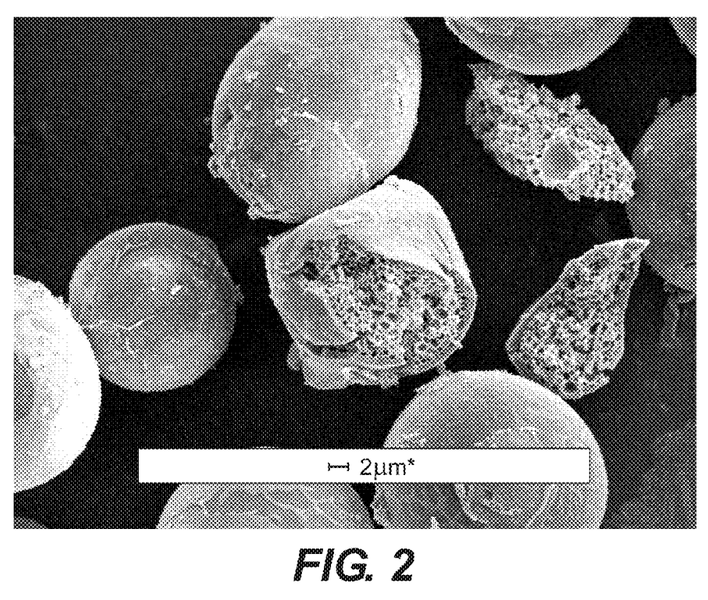
FIG. 2 is an SEM cross sectional image of a fractured particle of Example 2 showing a porous interior and a non-porous shell in accordance with the present invention.

Preparation of Porous Particles where Core has a Porosity and the Shell is Non-Porous Using Methanol for Phase Separation In Example 2 a particle was made as described in Example 1 except methanol was used instead of isopropanol. The particle size was between 15 and 20 micrometers and the porosity was estimated to be between 40 and 60 percent. FIG. 2, which is a SEM cross-section of a cryofractured particle of this Example shows the high level of porosity in the core and a non-porous shell which is the same binder as the core.

Example 3

Invention

Figure 3:
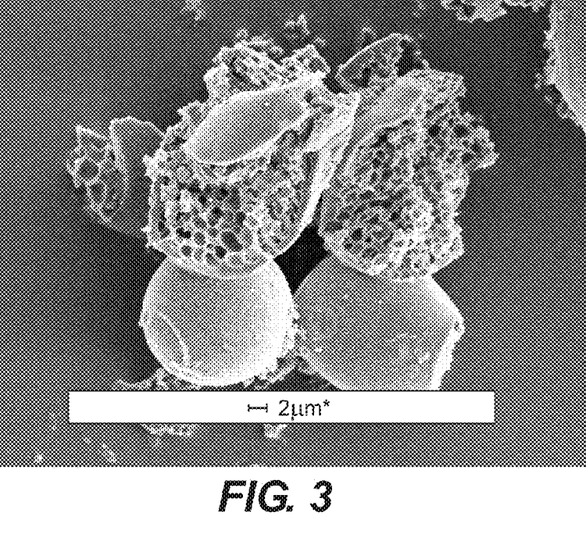
FIG. 3 is an SEM cross sectional image of a fractured particle of Example 3 showing a porous interior and a non-porous shell in accordance with the present invention.

Preparation of Porous Particles where Core has a Porosity and the Shell is Non-Porous Using Ethanol for Phase Separation In Example 3 a particle was made as described in Example 1 except ethanol was used instead of isopropanol. The volume median particle size was between 14 and 16 micrometers and the porosity was estimated to be between 40 and 60 percent. FIG. 3, which is a SEM cross-section of a cryofractured particle of this Example shows the high level of porosity in the core and a non-porous shell which is the same binder as the core.

Example 4

Control

Preparation of Non-Porous Particles without Using Phase Separation.

Figure 4:
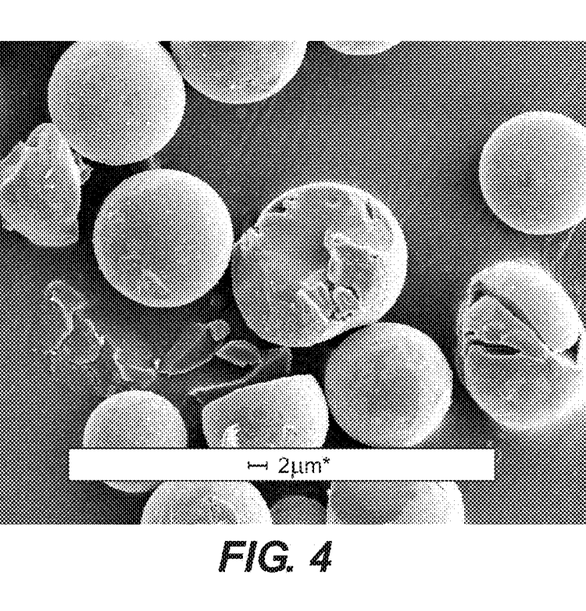
FIG. 4 is an SEM cross sectional image of a fractured particle of Control Example 4 showing the absence of internal porosity.

In Example 4 a particle was made as described in Example 1 except the addition of the LC emulsion to the nonsolvent isopropanol was eliminated. The particle size was between 10 and 14 micrometers and the porosity was substantially less than 1 percent. FIG. 4, which is a SEM cross-section of a cryofractured particle of this Example shows no observable porous structure.

Example 5

Control

Preparation of Non-Porous Particles without Using Phase Separation.

Figure 5:
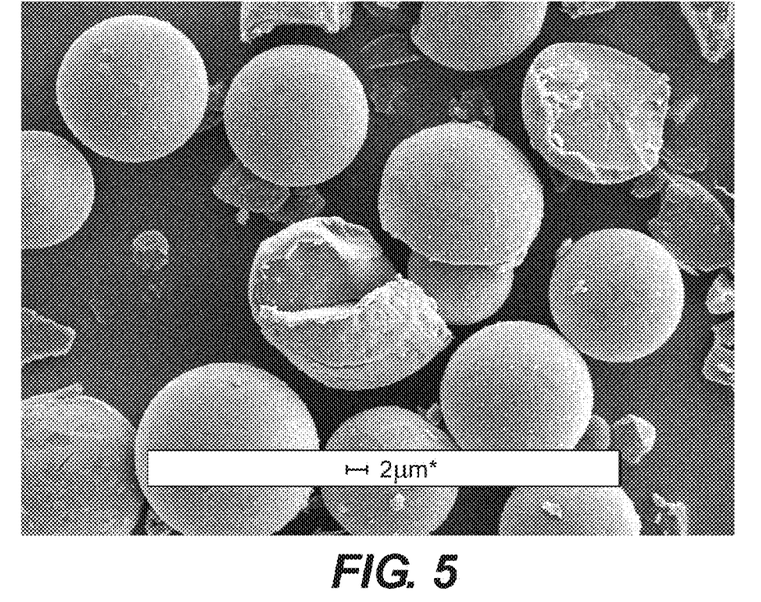
FIG. 5 is an SEM cross sectional image of a fractured particle of Control Example 5 showing the absence of internal porosity.

In Example 5 a particle was made as described in Example 1 except diethyl ether was used instead of isopropanol. Diethyl ether is miscible with ethyl acetate but is immiscible with water. The particle size was between 10 and 20 micrometers and the porosity was substantially less than 1 percent. FIG. 5, which is a SEM cross-section of a cryofractured particle of this Example, shows no observable porous structure. Note that this result is not anticipated by Stoy, et al., U.S. Pat. No. 4,110,529, which discloses a method for manufacturing porous spherical polymer particles made by dissolving the polymer in a solvent, dispersing this solution into a liquid dispersing medium that is a nonsolvent for the polymer, and then adding the solution, while stirring, into a liquid that is a nonsolvent for the polymer and which is also immiscible with the dispersing medium. Using a nonsolvent that is immiscible with the dispersing medium, water, does not produce porous particles by the process disclosed in this application.

Example 6

Invention

Figure 6:
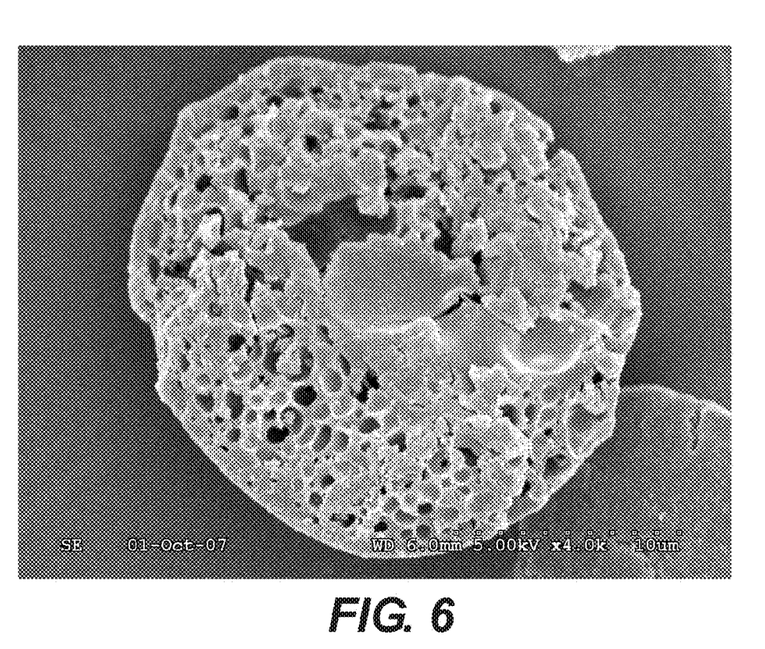
FIG. 6 is an SEM cross sectional image of a fractured particle of Example 6 showing a porous interior and a non-porous shell in accordance with the present invention.

Preparation of Pigmented Porous Particles where Core has a Porosity and the Shell is Non-Porous Using Methanol for Phase Separation In Example 6 a particle was made as described in Example 2 except that 4.5% by weight of Sun Chemical Pigment Blue 15:3 was added to the Kao E polyester solution prior to the preparation of the oil-in-water dispersion. The particle size was between 15 and 20 micrometers and the porosity was estimated to be between 30 and 60 percent. FIG. 6, which is an SEM cross-section of a cryofractured particle of this Example shows the high level of porosity in the core and a non-porous shell which is the same binder as the core.

The invention has been described in detail with particular reference to certain preferred embodiments thereof, but it will be understood that variations and modifications can be effected within the spirit and scope of the invention.

It is claimed:

1. A method of manufacturing porous core-shell polymer particles having a nonporous shell comprising:
providing a first organic solvent containing a dissolved polymer;
dispersing the organic solvent containing the dissolved polymer in an aqueous phase containing a stabilizer to form an emulsion comprising dispersed droplets of polymer solution;
adding the emulsion to an excess amount of a second organic solvent relative to the amount of the emulsion wherein the second organic solvent is miscible with water and the first organic solvent, and a non-solvent for the polymer; and
evaporating the first and second organic solvents from the emulsion to form porous core-shell polymer particles having a nonporous shell, wherein the particles have a porosity of from 10 to 70 percent and the nonporous shell has 1 percent or less pore content, and wherein when the emulsion is added to the second organic solvent, the second organic solvent causes phase separation to occur that forms the porosity within the cores.

2. The method of claim 1 further comprising:
isolating the core-shell polymer particles.

3. The method of claim 2 further comprising:
drying the core-shell polymer particles.

4. The method of claim 1 wherein the polymer is formed from vinyl monomers, condensation monomers, condensation esters, or mixtures thereof.

5. The method of claim 1 wherein the polymer is selected from the group consisting of polyesters; polymers of styrenes, monoolefins, vinyl esters, vinyl chloride, methylene aliphatic monocarboxylic acid esters, vinyl ethers and vinyl ketones.

6. The method of claim 1 wherein the first organic solvent further contains an additive selected from the group consisting of colorants, waxes and charge control agents.

7. The method of claim 1 wherein the stabilizer comprises poylvinylpyrrolidone, polyvinyl alcohol, colloidal silica or latex particles.

8. The method of claim 1 wherein the first organic solvent comprises a solvent selected from the group consisting of ethyl acetate, propyl acetate, chloromethane, dichloromethane, trichloromethane, carbon tetrachloride, ethylene chloride, trichloroethane, toluene, xylene, cyclohexanone, cyclohexane and 2-nitropropane.

9. The method of claim 1 wherein the second organic solvent comprises a solvent selected from the group consisting of methanol, ethanol, butanol, isopropanol and propanol.

10. The method of claim 1 wherein the second organic solvent comprises methanol, ethanol, or isopropanol.

* * * * *